(12) United States Patent
Repetto et al.

(10) Patent No.: US 6,825,987 B2
(45) Date of Patent: Nov. 30, 2004

(54) LIGHT GUIDE FOR DISPLAY DEVICES OF THE HEAD-MOUNTED OR HEAD-UP TYPE

(75) Inventors: Piermario Repetto, Turin (IT); Elena Borello, Rubiana (IT); Stefano Bernard, Turin (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 10/616,915

(22) Filed: Jul. 11, 2003

(65) Prior Publication Data

US 2004/0085649 A1 May 6, 2004

(30) Foreign Application Priority Data

Jul. 17, 2002 (IT) .......................................... TO02A0625

(51) Int. Cl.[7] ........................ G02B 27/14; G02B 6/26; G09G 5/00; F21V 7/04; G02F 1/3335
(52) U.S. Cl. ........................ 359/633; 359/630; 359/637; 359/15; 345/6; 345/7; 362/31; 362/32; 385/31; 349/65
(58) Field of Search ........................ 362/31, 32; 385/31; 349/65; 359/633, 630, 637, 634, 629, 15, 315, 317, 618; 345/6, 7, 8

(56) References Cited

U.S. PATENT DOCUMENTS

| | | | | |
|---|---|---|---|---|
| 4,264,135 A | * | 4/1981 | Lang | 359/317 |
| 4,344,671 A | * | 8/1982 | Lang | 359/618 |
| 4,711,512 A | * | 12/1987 | Upatnieks | 345/7 |
| 5,153,774 A | * | 10/1992 | Migozzi et al. | 359/633 |
| 5,369,415 A | * | 11/1994 | Richard et al. | 345/6 |
| 5,724,163 A | * | 3/1998 | David | 359/15 |
| 5,850,308 A | * | 12/1998 | Dastidar | 359/315 |
| 5,863,113 A | * | 1/1999 | Oe et al. | 362/31 |
| 5,905,826 A | * | 5/1999 | Benson et al. | 385/31 |
| 6,147,725 A | * | 11/2000 | Yuuki et al. | 349/65 |
| 6,169,613 B1 | * | 1/2001 | Amitai et al. | 359/15 |

* cited by examiner

*Primary Examiner*—Loha Ben
(74) *Attorney, Agent, or Firm*—Sughrue Mion, PLLC (57) ABSTRACT

A light guide for display devices of the head-mounted or head-up type comprises:

a body of the light guide (22) at least in part transparent to visible light;

a coupling device (24) associated to the body of the light guide (22) and designed to couple the body (22) to an optical system (18) designed to generate an image, the coupling device (24) being obtained in such a way that the light beams coming from the optical system (18) enter the body of the light guide (22) and propagate within the body (22) by total internal reflection; and an image-extraction grating, designed to extract the light beam that propagate in the body of the light guide (22) so as to enable an observer to visualize the extracted image against a background visible in transparency through the body of the light guide (22), wherein the extraction grating (32) is set in the proximity of one of the outer surfaces of the guide and has a saw-tooth profile, and wherein the extraction grating (32) is coated with a partially reflecting coating deposited prevalently on the surfaces of the teeth that are least inclined with respect to the surfaces of the guide.

43 Claims, 6 Drawing Sheets

LIGHT GUIDE FOR DISPLAY DEVICES OF THE HEAD-MOUNTED OR HEAD-UP TYPE

The present invention relates to a light guide for display devices of the head-mounted or head-up type.

The purpose of display devices of the head-mounted or head-up type is to present an image, generated, for example, by a microdisplay, superimposed on a background in such a way that an observer will be able to see the image generated by the microdisplay without having to distract his attention from the background itself.

There are already present on the market a number of solutions for presenting to an observer the image generated by a microdisplay.

Micro Optical Inc. offers on the market two solutions, described in documents U.S. Pat. No. 5,715,377, U.S. Pat. No. 5,886,822, U.S. Pat. No. 6,023,372 and U.S. Pat. No. 6,091,546. A first solution is an optical system that can be clipped onto an ordinary pair of spectacles, the said system being made up of a display that generates the image, an optical system that forms a virtual image of the microdisplay at an appropriate distance, and a light guide that presents the image to the eye of the user. This solution is not rigorously definable as "see-through", in so far as the image that is returned to the observer is not superimposed onto the background. Since, however, the background is visible in the entire field of view around the image presented to the observer, said solution is defined as "see-around". The display presents, however, a limited field of view and can thus return only low-resolution images (11° in the horizontal direction). A second solution is of the "englobed optics" type, in which a display generates the image which, through a system of lenses and prisms englobed directly in the lens of the spectacles of the user, is presented to the latter at an appropriate distance. A half-reflecting deviating prism set at 45° with respect to the surface of the lens and in the centre of the field of view causes the image to be presented to the user superimposed on the background. The external overall dimensions of this solution are quite small; however, use of the deviating prism at 45° implies a thickness of the lenses of the spectacles which is at least equal to the output pupil of the system. Since the said output pupil increases with the field of view of the display in order to guarantee a sufficient tolerance of positioning of the eye (referred to hereinafter as "eye-motion box" or EMB), the solution proposed is usable only for limited fields of view (11° in the horizontal direction) and low resolution (320×240 pixels).

The document US-A1-20010033401 describes a solution that envisages the use of a light guide, in which the beams emitted by the display (geometrically coupled within the light guide without interposition of any optical devices), after traversing an appropriate stretch in total internal reflection between the walls of the light guide are extracted by means of a holographic optical device. This system is light and presents small overall dimensions and is therefore particularly suitable for a solution of the "clip-on" type, i.e., one that envisages clipping the device on the user's spectacles. However, the optics of the system of a holographic type is markedly non-axial and, hence, is affected by numerous aberrations, in particular by a trapezoidal distortion of the field. Although the process of production of the hologram has been conceived so as to reduce to the minimum the problems linked to non-axiality and, hence, to aberration, such problems would, however, be of an even greater degree in the case where the intention were to use the proposed solution for a field of view of a greater amplitude (>160°). Furthermore, as is known, holographic optical systems are markedly sensitive to variations both in the angle of incidence and in the wavelength. Dependency upon the angle of incidence entails different levels of efficiency of extraction for the light that propagates in the guide at different angles, this necessarily limiting the field of view that can be used in the proposed solution. Dependency upon the wavelength entails different levels of extraction efficiency for light of different wavelengths, this limiting use of this solution to displays of the monochromatic type. Use of this solution in displays with wider fields of view and/or in colour displays entails a significant reduction in the efficiency of extraction of the hologram, i.e., the fraction of light that propagates in the guide which is deviated towards the eye of the observer.

The document U.S. Pat. No. 6,169,613 describes a solution with holographic optics comprising a light guide and three diffractive optical elements. The first optical element couples within a light guide the image generated by an appropriate optical system, causing the light beams to propagate within the guide by total internal reflection. The second optical element rotates through 90° the direction of propagation of the beams that impinge thereon, at the same time enabling expansion of the pupil in the direction of propagation previous to the rotation performed by the holographic element. The third element extracts the beams that impinge thereon, reducing their angle of propagation to a value lower than that of the angle of total internal reflection, and at the same time enables expansion of the pupil in the direction of propagation subsequent to the rotation performed by the second holographic optical element. This solution enables amplification of the size of the output pupil in two directions substantially orthogonal to one another and lying in a plane perpendicular to the direction of sight of the observer. The efficiency of rotation of the second diffractive optical element increases in the direction of propagation in the guide so as to guarantee that the portion of beam rotated at each subsequent reflection will be constant. Likewise, the efficiency of extraction of the third diffractive optical element increases in the direction of propagation in the guide so as to guarantee that the portion of beam extracted from the guide at each successive reflection will be constant. The solution with three holographic optical elements becomes necessary when the specifications of the field of view and/or EMB of the display are such as to require an expansion of the pupil in two directions. Alternatively, it would be possible to increase the dimensions of the output pupil of the coupling optical device and use a two-hologram solution. However, the increase in the output pupil of the coupling optical device typically involves the use of a more complex, costly and cumbersome optical chain, as is known to persons skilled in the branch of optical design.

An alternative solution is described in the patent application FR8906721, which describes a combination optical device consisting of a transparent light guide with a plane end forming an access optically coupled to the collimation optical system and two large plane-parallel faces, and, within the guide, a number n>1 of half-reflecting mirrors set parallel to one another and inclined with respect to the straight section of the guide. The light coupled inside the guide propagates by total internal reflection until it encounters the first of said half-reflecting mirrors. Part of the light is deflected by the mirror and extracted by the light guide, whilst another part continues its propagation within the guide until it encounters the second half-reflecting mirror. The reflectance decreases from the first to the last mirror so as to guarantee a uniformity of the light extracted from the guide.

The patent application FR8906721 basically repeats the patent U.S. Pat No. 4,099,841, which describes a head-up display. The combiner of the display described in this invention is based upon a light guide that includes three or more partially reflecting layers arranged parallel to one another and used basically for the same purposes as those described in the patent application FR8906721.

The solution presented in the document FR8906721 is taken up by the patent U.S. Pat. No. 5,153,774, with the addition of new inventive content.

A solution, which is substantially identical to the one described in the patent application FR8906721 both in terms of the description and in terms of the claims, is proposed in the recent patent application WO01/95027-A1.

The solution proposed in the patent application FR8906721 represents a valid alternative to the holographic solution presented in the document U.S. Pat. No. 6,169,613. The absence of holographic elements represents an advantage for application thereof in colour displays, especially in the case of a wide field of view.

However, the solution with parallel-half reflecting mirrors presents a certain number of disadvantages as compared to the holographic solution. The holographic optical elements described in U.S. Pat. No. 6,169,613 may be gratings of the surface-relief type. Gratings of this type can be replicated conveniently using moulding technologies, for example, injection moulding, casting or hot embossing. This means that the holographic solution is very well suited to large-scale production such as the ones typically adopted for consumer electronics. Instead, the solution with half-reflecting mirrors typically involves fabrication procedures that are decidedly more complex. Some possible manufacturing solutions are described in the patent application WO01/95027-A1. One of these solutions envisages bonding of a number of plates of glass, each coated with a half-reflecting layer having a different value of reflectance and subsequently cut in a direction that is substantially oblique to the planes of the glass plates. The process is all the more complex and costly, the greater the number of half-reflecting mirrors. For a certain specified value of EMB, the number of the mirrors is the higher, the smaller the thickness of the guide. This means that the solution is not competitive when the aim is to make a guide having a thickness that is, for instance, smaller than 3 mm. On the other hand, thick light guides (>5 mm) may entail the need to vary the reflectance of the coating not only between adjacent mirrors but also on the individual mirror in order to prevent the alignment of a number of mirrors in certain sectors of the field of view from leading to a lack of uniformity of luminance within the field of view itself.

The purpose of the present invention is to provide a light guide for display devices of the head-mounted or head-up type which will enable the drawbacks of the known solutions to be overcome.

According to the present invention, the above purpose is achieved by a light guide having the characteristics forming the subject of the main claim. In particular, the solution proposed enables both the limits of performance deriving from the use of diffractive or holographic optical devices and the limits on technologies of fabrication and on the performance deriving from the use of half-transparent mirrors englobed within the light guide to be overcome. This is achieved through the use of a half-reflecting grating set in the proximity of one of the faces of the light guide, which can be built using a moulding process and coated with a half-reflecting layer deposited in a prevalent way on the optically active surfaces of the grating.

The solution according to the present invention further enables light guides having thicknsses smaller than 5 mm to be made, also resorting to inexpensive technological solutions.

The present invention will now be described in detail with reference to the annexed drawings, which are provided purely by way of non-limiting example, and in which.

Figure 1:
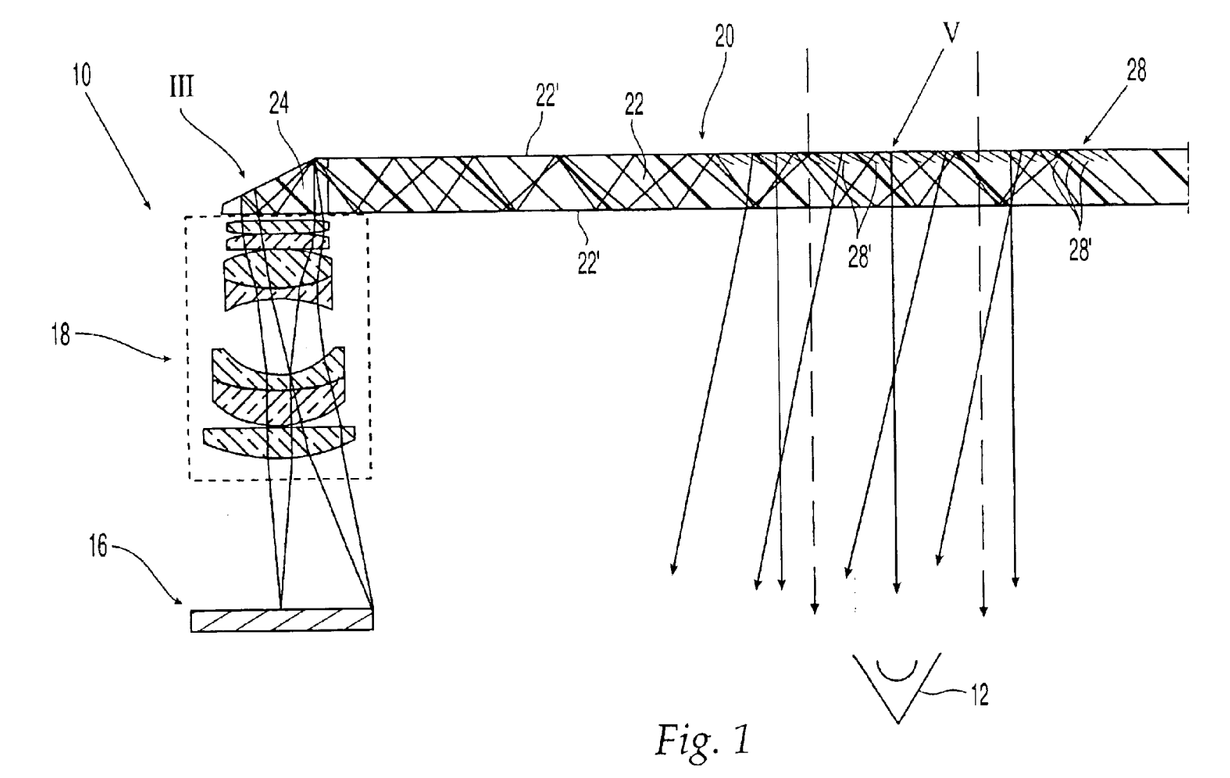
FIG. 1 is a schematic illustration of a display device including a light guide according to the present invention.

With reference to FIG. 1, designated by 10 is a system for displaying a virtual image of the head-mounted-display (HMD) or head-up-display (HUD) type, of the "see-through" type, i.e., one in which the image generated by the system is presented to the observer, designated by 12, superimposed on a background visible through a transparent or semi-transparent part of the display system 10.

The display system 10 comprises an image-generating device 16, which may be of any known type. The image-generating device 16 may consist of a microdisplay, for example, of the liquid-crystal type, operating either in transmission or in reflection, or a CRT display, or an organic or inorganic electroluminescent display.

The image-generating device 16 is associated to an optical system 18, which is made up of a series of appropriate lenses and forms a virtual image of the real image, produced by the image-generating device 16. The virtual image may be generated at a distance ranging from 1 meter to infinity, according to the distance at which it is intended to present the image to the observer 12. The light comes out of the optical system 18 as a superposition of parallel beams (in the case of an image at infinity) which propagate in different directions, covering the entire field of view.

In a preferred embodiment, the display has a format of the SVGA type, i.e., 800×600 pixels; the individual pixel of the microdisplay is square and has a linear dimension comprised between 10 and 15 $\mu$m; the field of view produced by the optical system 18 for formation of the virtual image is 24×18 degrees. In another preferred embodiment, the display has a QVGA format, i.e., 320×240 pixels, and the field of view produced by the optical system 18 is 16×12 degrees. Further preferred embodiments are the following: QVGA format with field of view of 12×9 degrees, VGA (640×480) format with field of view of 16×12 degrees, and VGA format with field of view of 24×18 degrees.

Figure 2:
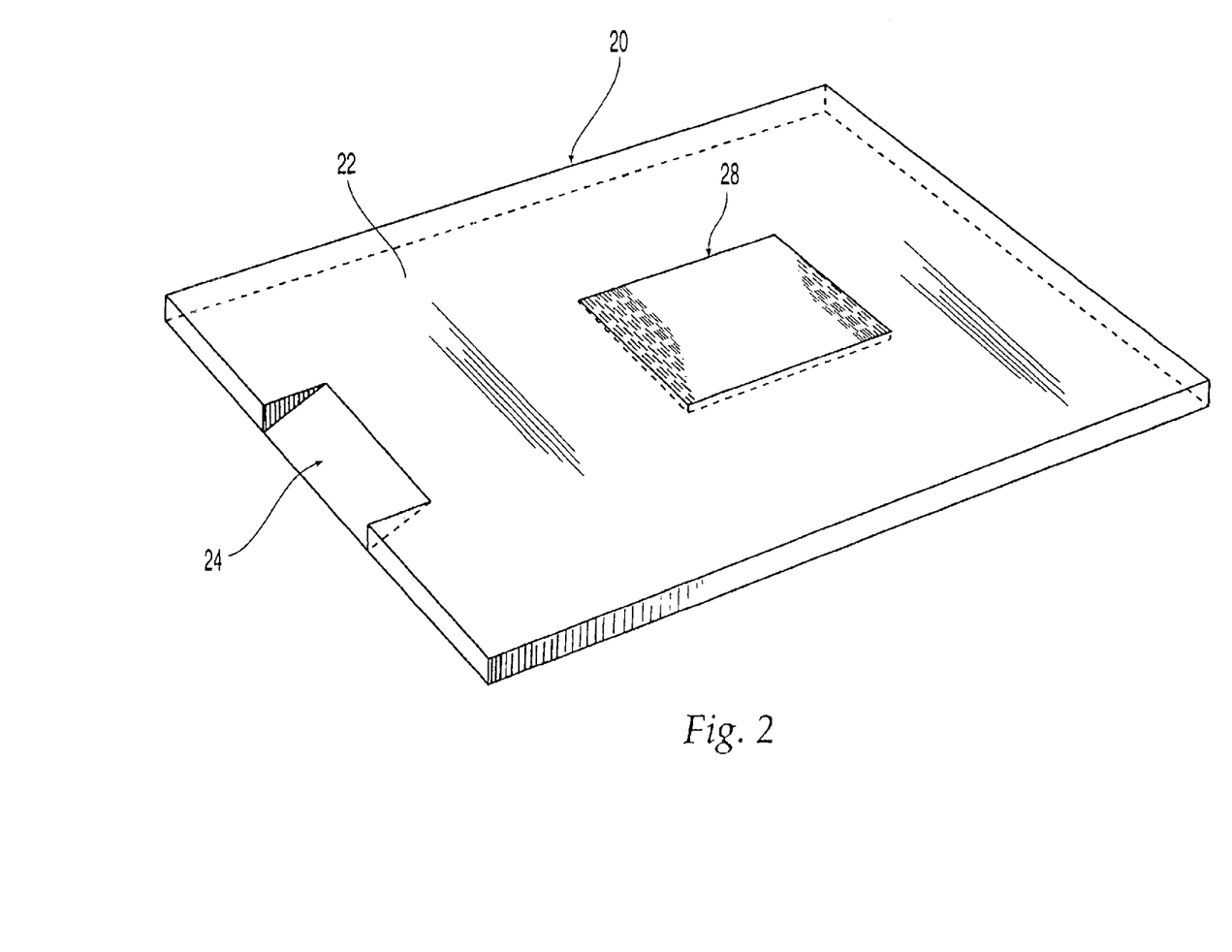
FIG. 2 is a schematic perspective view illustrating a first embodiment of a light guide according to the present invention.

The display system 10 according to the present invention comprises a light guide 20, which comprises a plate-shaped body 22 made of transparent or semi-transparent material with two principal faces 22'. The body of the light guide 22 may be made of glass, polycarbonate or polymethylmethacrylate. The body of the light guide 22 has a thickness preferably comprised between 2 mm and 5 mm. The body of the light guide 22 could have at least one of its principal faces 22' not plane, or else both of the faces plane but not parallel.

Figure 3:
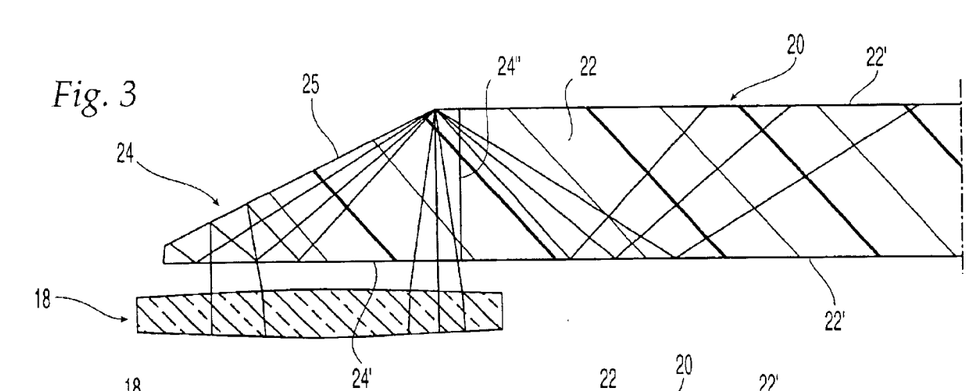
FIG. 3 is a schematic view at an enlarged scale of the coupling device indicated by the arrow III in FIG. 1.
Figure 4:
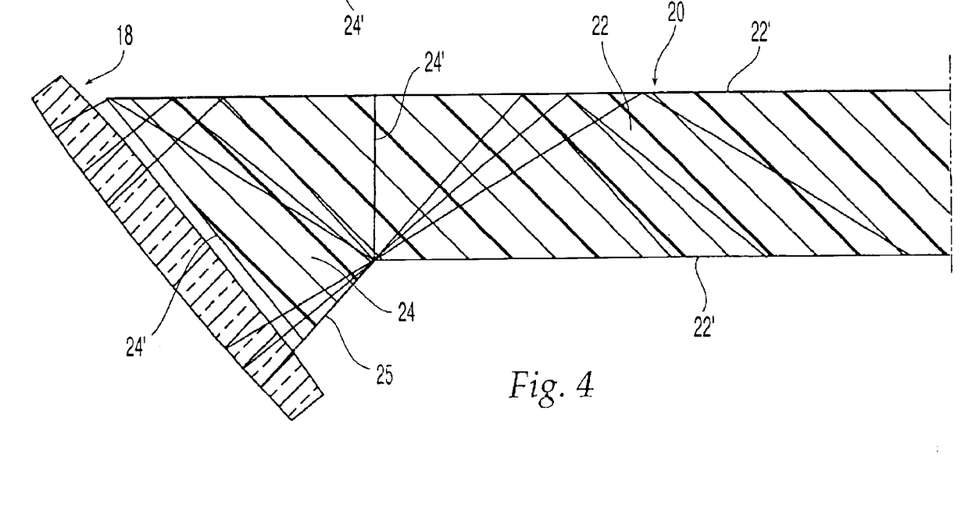
FIG. 4 is a schematic view illustrating a variant of the coupling device of FIG. 3.
Figure 5:
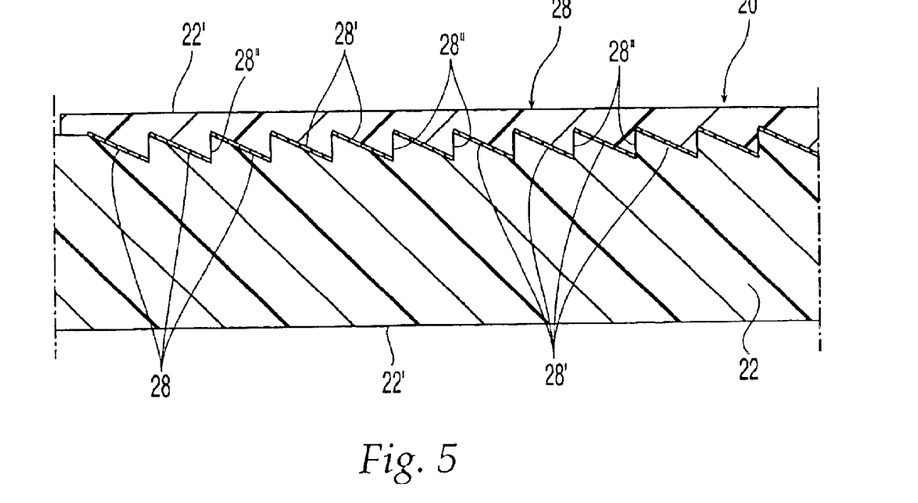
FIG. 5 is an enlarged schematic detail of the part indicated by the arrow V in FIG. 1.

The light guide 20 comprises a coupling device 24 which receives the light beams coming from the optical system 18 and couples them to the body of the light guide 22. The coupling device 24 may be made up of an optical component integrated in the body of the light guide 22. In the embodiment illustrated in FIG. 3, the coupling device 24 is made up of a prism having an input surface 24' parallel to the principal faces 22' of the body of the light guide 22, an output surface 24" orthogonal to the principal faces 22' of the body of the light guide 22, and a radiusing plane surface 25, which is totally or partially reflecting and inclined with respect to the surfaces 24', 24". In the variant of FIG. 4, the coupling device 24 is made up of a prism having an input surface 24' inclined with respect to the principal faces 22' of the body of the light guide 22, an output surface 24" orthogonal to the principal faces 22' of the body of the light guide 22, and an opaque radiusing surface 25.

In both cases, the light beams coming from the optical system 18 are deviated inside the body of the light guide 22 and start to propagate with angles greater than the angle of total internal reflection. To obtain this, the geometry of the coupling device 24 set between the set of beams generated by the optical system 18 and the body of the light guide 22, is such that each beam impinges upon the principal faces of the body 22 with an angle α, with respect to a direction orthogonal to the principal faces of the body 22, greater than the limit angle $\theta_{lim}$ defined as:

$$\sin\theta_{lim} = \frac{1}{n}$$

where n is the refractive index of the material constituting the body of the light guide 22. Hence, all the light beams propagate in the body 22 without any loss of energy. In both of the variants, the input surface 24' of the coupling device 24 may be plane or curved. The input surface 24' of the coupling device 24 may also consist of a diffractive grating.

The light propagates in the body of the light guide 22 with a minimum angle of incidence comprised between 39° and 45° and a maximum angle of incidence comprised between 55° and 65°. The limit angle is for example 41.8° for polymethylmethacrylate (PMMA).

Figure 6:
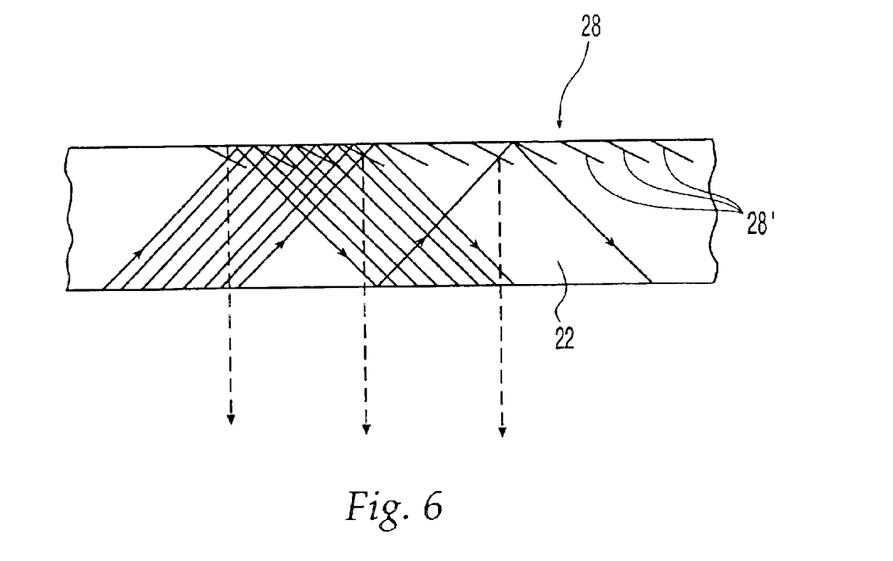
FIG. 6 is a schematic view which illustrates the operating principle of the system for image extraction according to the present invention.

The light guide 22 according to the present invention comprises a system 28 for extraction of the image which consists of a half-transparent grating, positioned in the proximity of one of the principal faces 22' of the light guide 22. As is illustrated in FIG. 6, said grating 28 has a saw-tooth profile with surfaces 28' inclined with respect to the principal faces 22' and radiused together by surfaces 28" that are substantially perpendicular to the faces 22'.

The grating is coated with a thin half-reflecting layer, deposited prevalently on the surfaces 28'. The half-reflecting layer is, in turn, coated with a layer of material having a refractive index that is substantially the same as that of the guide 22 and having a surface facing the grating 28, which follows its profile, and a plane surface parallel to the principal faces 22' of the guide 22.

The surfaces 28' reflect part of the light which propagates in the guide by means of total internal reflection, modifying the angle of propagation in the guide according to the laws of reflection. The remaining part of the light passes undisturbed through the surfaces 28' and continues its propagation in the guide until it again encounters the matrix. The ratio between the light reflected and the light transmitted by the micromirrors depends exclusively upon the reflectance of the coating. The interaction between the light and the radiusing surfaces 28" is minimized in so far as the reflecting coating on said surfaces is substantially absent, thanks to the specific process of deposition used.

The light beams propagate in the guide in a direction parallel to the principal faces of the body of the light guide 22 and encounter the grating 28. The surfaces 28' are parallel to one another and inclined with respect to the faces of the body of the light guide 22 in such a way that the beam associated to the central direction of the field of view will be extracted in a direction orthogonal to the faces of the body of the light guide 22.

The surfaces 28' are completely embedded in the material of which is the body of the light guide 22 is made or else are comprised between two materials that are different but have the same refractive index in such a way that the portion of beam that passes through the surfaces 28" propagates in the body of the light guide 22 without undergoing any deviation.

When a beam reaches the image-extraction structure 28, it interacts with the surfaces 28'. A portion of the energy of the light beam is deviated and extracted from the body of the light guide, given that it impinges upon the opposite face with an angle smaller than the limit angle. The remaining portion of the energy of the beam is transmitted through the surfaces 28" and is reflected by total internal reflection by the underlying face of the body of the light guide 22 and proceeds in its propagation, interacting again with the surfaces 28' at the next reflection.

In the embodiment illustrated by way of example in the figures, the image-extraction structure 28 lies in a plane parallel to the faces of the body of the light guide 22 and in the proximity of the underlying face. Alternatively, the image-extraction structure 28 may be set on a plane, which is inclined with respect to the direction of propagation of the light and radiuses the two parallel plane faces 22' of the body of the light guide 22. As a further alternative, the image-extraction structure 28 may be set on a spherical or else aspherical surface immersed in the body of the light guide 22.

In a preferred embodiment, the pitch of the grating 28 is 500 µm, and the beams in the horizontal direction of the field of view propagate with angles comprised between 43° and 59° (which corresponds to a horizontal field of view out of the guide of 24°). The inclination of the surfaces 28' of the micromirrors is 25.5°. The inclination is calculated in such a way that the beam corresponding to the central direction of the field of view, after it has propagated within the light guide with an angle of 51°, is again extracted therefrom in a perpendicular direction.

According to one aspect of the present invention, the image-extraction structure 28 may be obtained according to the following operating steps:

formation of the body of the light guide 22, for example, by means of injection-moulding or casting; in this step, one part of the surface of the body of the guide is formed with a saw-tooth profile (like a linear Fresnel grating);

deposition of a reflecting layer, for example by means of evaporation in a vacuum chamber, on the saw-tooth profile; the reflecting layer may be, for example, made of silver or aluminium to guarantee a high value of reflectance and not to have significant chromatic effects; and casting of a polymeric material, with optical properties (refractive index, achromaticity and transparency) substantially equal to those of the body of the light guide in order to englobe the teeth of the saw-tooth profile within the body of the guide with parallel plane faces.

The process of deposition may be carried out in a highly directional way in such a way that the radiusing vertical surfaces 28" of the teeth are not coated by the reflecting material.

If the thickness of the coating is constant throughout the profile of the image-extraction structure, the reflectance of the individual surfaces 28' will be constant. The value of reflectance of the surfaces 28' may be constant and comprised between 0.10 and 0.30.

If the reflectance ρ of the individual surfaces 28' is constant, the intensity I of the extracted image decreases progressively with the number of successive extractions of the beam. To a first approximation, the n-th extracted image of each beam has an intensity of:

$$I_n = I_0(1-\rho)^{n-1} \cdot \rho$$

The ratio between the intensities of the beams extracted in successive extractions is given by:

$$\frac{I_n}{I_{n-1}} = (1-\rho)$$

In classic systems for extraction of the light from a guide, based upon beam splitters, the transmittance τ of the guide (i.e., the fraction of light coming from the background that reaches the observer) and the efficiency ρ of extraction of the light in the guide are linked by the relation:

$$\tau + \rho = 1$$

Hence, for example, a transmittance of 80% corresponds to an efficiency of extraction of 20%. In the present solution, instead, the presence of a number of successive extractions enables the amount of extracted energy to be multiplied, thus violating the preceding relation which remains valid just for the single extraction. In fact, if $\rho_{eff}$ is the overall efficiency of extraction of the system and ρ the efficiency of extraction of the individual extraction, after n extractions we have:

$$\rho_{eff} = 1 - (1-\rho)^n$$

For example, with ρ=0.2 we find that, after n=2 extractions, the total efficiency is $\rho_{eff}$=0.36 and, after n=3 extractions, it rises to $\rho_{eff}$=0.488. The transmittance ρ of the guide remains in all cases equal to 0.8. In other words, τ+ρ=1 but $\tau + \rho_{eff} \geq 1$.

It is possible to choose the position of the user's eye in such a way that, within the field of view, the luminance will not vary more than 30%, a value of lack of uniformity that the human eye is able to compensate automatically thus preventing said lack of uniformity from being perceived by the user (Farrell, Booth, 1984, "Design handbook for imagery interpretation equipment").

Alternatively, the lack of uniformity may be compensated using for the surfaces 28' a reflecting coating having a variable reflectance. For example, the reflectance of the surfaces 28' may be variable and range between 0.15 and 0.2 or else between 0.2 and 0.26.

However, a variable reflectance implies also a variable transmittance of the body of the light guide 22. In other words, the view of the background through the light guide will depend upon the position of the eye with respect to the guide. The variable-reflectance coating may therefore be used, as long as the variation of reflectance (and hence of transmittance) of the guide is not greater than 30% (for the reasons described above). Use of a variable-reflectance coating, even though it is more costly to obtain as compared to the constant-reflectance coating, may hence be indicated for compensating altogether or in part the lack of homogeneity of luminance within the eye-motion box.

In a preferred embodiment of the present invention, the coupling device 24 is obtained in such a way that the beams propagate in the body of the light guide in such a way that any section of the faces 22' in the direction of propagation is touched by all the beams. In other words, with reference to FIG. 7, if a single beam propagating in a just one direction is considered, the stretch of the surface of the body of the light guide 22 which reflects the beam at the n-th reflection is adjacent to the stretch of the body of the light guide 22 which reflects the beam at the (n+1)-th reflection. This guarantees that, at any point of the guide where it is intended to extract the light beam, said beam will actually be present.

Figure 7:
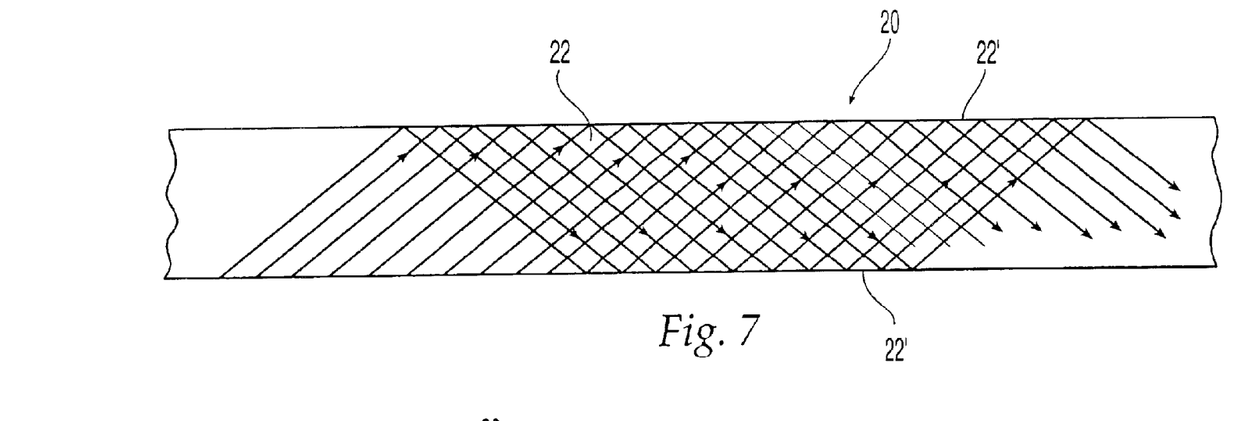
FIGS. 7 and 8 are schematic illustrations the modalities of propagation of the light within the light guide.

This condition is obtained imposing that:

$$l = 2 \cdot d \cdot \tan \alpha$$

where l is the size of the beam projected on the surface of the plate, d is the thickness, and α the internal angle of propagation.

Figure 8:
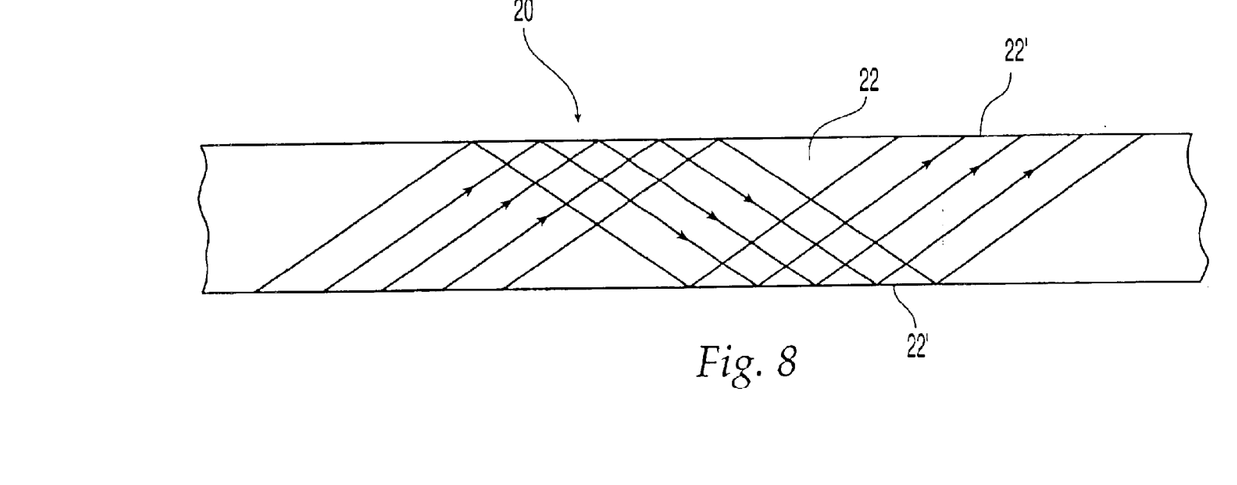

FIG. 8 illustrates the case where the aforesaid condition is not verified. The triangles without a dashed line indicate the stretches of surface that are not impinged upon by the reflected beam.

The geometry of propagation in the body of the light guide, with each beam that reflects so as to be always adjacent to itself (condition of FIG. 7), is useful at the moment of extraction, since the portion of beams extracted at the n-th reflection will be perfectly adjacent to the portion extracted at the (n+1)-th reflection, without any superposition or empty spaces. This means that the beam extracted from the structure for a generic direction will have a linear dimension l' (in the direction of propagation within the guide) equal to the linear dimension (previously designated by l) of the beam during propagation in the guide, multiplied by the number of extractions that the beam has undergone.

This effect of multiplication is obviously not obtained in the direction orthogonal to the direction of propagation. The net effect is an expansion of the output pupil of the image-formation system in the direction of propagation (indicated in FIG. 2 as the horizontal direction).

The sizing of the extractive profile may be evaluated geometrically. If l' is the linear dimension of the extracted beam in the direction of propagation in the guide and α is the maximum half-divergence (i.e., half of the horizontal field of view), at a distance d the "eye-motion box" EMB is given by:

$$EMB = l' - 2 \cdot d \cdot \tan \alpha$$

This calculation is valid for sizing the extractive profile both in the direction of extraction (i.e., the horizontal direction) and in the direction orthogonal thereto (i.e., the vertical direction): in the first case l' is the width resulting from the multiplication of the dimension by means of the multiple extractions; in the second case l' is just the width of the beam, there not being any multiplication. If we consider a vertical dimension of the EMB equal to the horizontal dimension, this presupposes, at input, a vertical dimension of the beams greater than the horizontal dimension.

In general, the distance d between the light guide and the observer, known as "eye-relief distance" or ERD, must be at least equal to a minimum value comprised between 20 and 25 mm in such a way that the light guide will not interfere mechanically with the spectacles possibly worn by the user.

Figure 9:
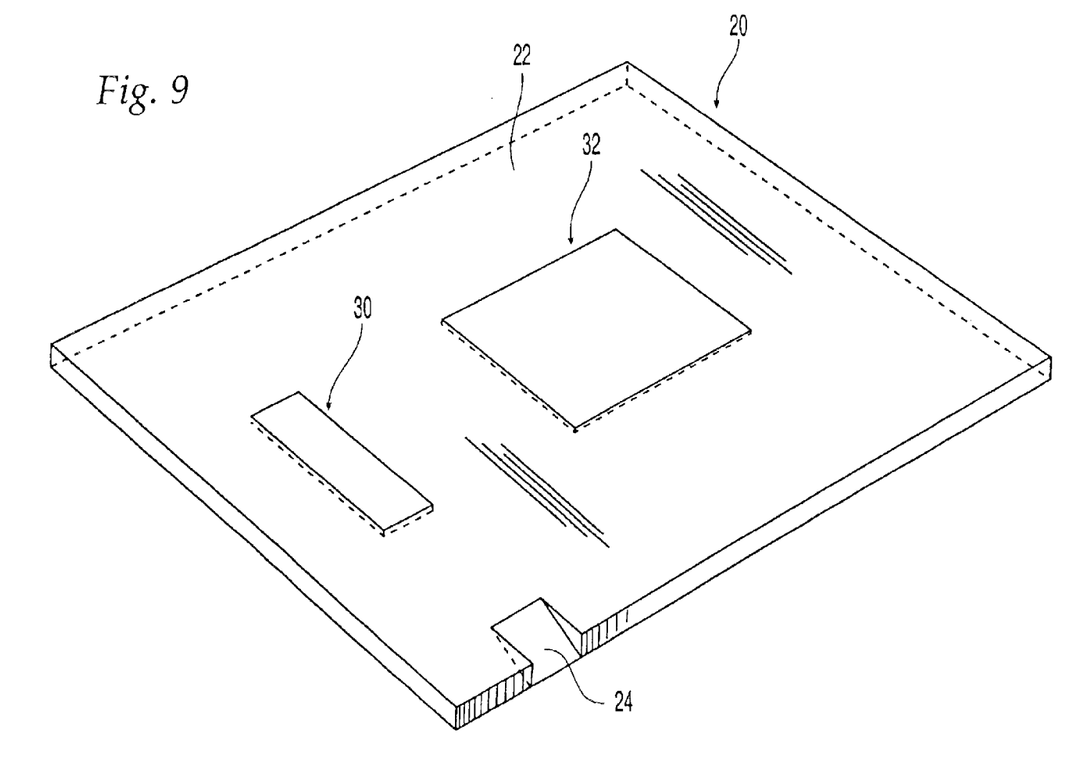
FIG. 9 is a schematic perspective view which illustrates a second embodiment of the light guide according to the present invention.

With reference to FIG. 9, a second embodiment of the light guide according to the present invention comprises two half-reflecting gratings 30, 32 with embedded micromirrors. The first half-reflecting grating 30 has the function of expanding the pupil in the vertical direction and simultaneously rotating the direction of propagation in the body of the light guide 22 through 90° (from vertical to horizontal). The second half-reflecting grating 32 has the function of expanding the pupil in the horizontal direction and simultaneously extracting the light from the guide (in a way substantially equal to what is done by the embedded—structure 26 of the embodiment described above).

The gratings 30 and 32 are positioned in the proximity of one of the principal faces 22' of the light guide 22. The face may be the same for both, or else the gratings 30 and 32 may be positioned in the proximity of two opposite faces. The grating 30 (32) has a saw-tooth profile, with surfaces 30' (32') inclined with respect to the principal faces 22' and radiused together via the surfaces 30" (32"), which are substantially perpendicular to the surfaces 22'.

The grating 30 (32) is coated with a thin half-reflecting layer deposited prevalently on the surfaces 30' (32'). The half-reflecting layer is in turn coated with a layer of material having a refractive index that is substantially the same as that of the guide 22 and having a surface facing the grating 30 (32) which follows the profile thereof, and a plane surface parallel to the principal faces 22' of the guide 22. Propagating within the guide in the vertical direction, the beams encounter the first structure 30. The surfaces 30' of the grating 30 are parallel to one another and inclined in such a way that the beams that propagate in the body of the light guide 22 are rotated through 90°, modifying the direction of propagation from vertical to horizontal. The surfaces 30' are partially reflecting with a reflectance that is constant or else increasing in the direction of propagation (vertical direction) in such a way that the fraction of intensity of the beam reflected by the surfaces 30' in successive reflections will be substantially constant throughout the structure. In the case of constant reflectance, the value of the reflectance could be comprised between 0.15 and 0.25. In the case where the reflectance of the beam-rotation structure 30 is variable, the range of variation of the reflectance value may range between 0.20 and 0.90 or else between 0.30 and 0.90 or else between 0.10 and 0.90.

It is to be noted how the range of variation of reflectance for the beam-rotation structure 30 can be substantially wider than that corresponding to the extraction structure 32 in so far as, whereas the latter is located within the field of view of the observer and must hence guarantee a uniformity of transmittance higher than or equal to 30% (Farrell, Booth, 1984, "Design handbook for imagery interpretation equipment"), the beam-rotation structure 30 may be positioned outside the field of view of the observer and hence present a lack of uniformity in transmission of a degree higher than 30%.

The structure 30 is completely embedded in the material of which the body of the light guide 22 is made, i.e., is packed between two materials that are different but have the same refractive index, in such a way that the portion of beam transmitted by the surfaces 30' will propagate in the guide without undergoing any deviation.

When a beam, which is propagating in the guide in the vertical direction, reaches the first structure 30, it interacts with the reflecting coating. A fraction of the beam is deviated in such a way that it continues to propagate in the guide with the same angle of incidence with respect to the faces 22' of the guide, but in the horizontal direction. The part of beam that is transmitted through the coating is reflected by total internal reflection from the underlying face of the guide and proceeds with its propagation in the vertical direction, interacting again with the surfaces 30' at the subsequent reflection.

In a preferred embodiment, the pitch of the first structure 30 is 500 $\mu$m, and the inclination of the reflecting surfaces 30' is approximately 30°.

After undergoing rotation, the beams propagate in the body of the light guide 22 in the horizontal direction until they encounter the second structure 32. Said structure is substantially the same as the one described in the foregoing embodiment and performs the same function.

The geometry of propagation in the body of the light guide 22 with each beam which is reflected so as to be always adjacent to itself (condition of FIG. 7) is useful both at the moment of the rotation through 90° carried out by the first structure 30, and at the moment of the extraction performed by the second structure 32, since the portion of beams extracted at the n-th reflection will be perfectly adjacent to the portion extracted at the (n+1)-th reflection, without any superposition or empty spaces. This means that the beam extracted from the structure for a generic direction will have a linear dimension l' in the horizontal (or vertical) direction equal to the linear dimension (previously designated by l) of the beam during propagation in the guide, multiplied by the number of extractions (or deviations) that the beam has undergone.

The net effect is an expansion of the output pupil of the image-formation system both in the vertical dimension, thanks to the first structure 30, and in the horizontal dimension, thanks to the second structure 32.

As compared to the optical solutions for projection of an image present on the market, the solution according to the present invention presents numerous advantages, among which:

low cost of fabrication;

absence of effects of chromatism;

absence of diffractive effects both in transmission and in extraction;

good efficiency of extraction; and excellent see-through characteristics.

What is claimed is:

1. A light guide for display devices of the head-mounted or head-up type, comprising:

a body of the light guide at least in part transparent to visible light;

a coupling device associated to the body of the light guide and designed to couple the body to an optical system designed to generate an image, the coupling device being obtained in such a way that the light beams coming from said optical system enter the body of the light guide and propagate in the body by total internal reflection; and an image-extraction grating designed to extract the light beams which propagate in the body of the light guide so as to enable an observer to visualize the extracted image on a background visible in transparency through the body of the light guide;

wherein said extraction grating is set in the proximity of one of the outer surfaces of the guide;

said extraction grating has a saw-tooth profile;

said extraction grating is coated with a partially reflecting coating deposited prevalently on the surfaces of the teeth that are least inclined with respect to the surfaces of the guide; and said coating is in turn coated with a layer of material having a refractive index that is substantially the same as that of the body of the light guide and having a surface facing the extraction grating, which follows the saw-tooth profile, and another plane surface which is substantially parallel to the outer surface of the guide in an area corresponding to which the grating is made.

2. The light guide according to claim 1, comprising a beam-rotation grating, set between said coupling device and said image-extraction grating.

3. The light guide according to claim 2, wherein:
said rotation grating is set in the proximity of one of the outer surfaces of the guide;
said rotation grating has a saw-tooth profile;
said extraction grating is coated with a partially reflecting metal layer deposited prevalently on the surfaces of the teeth that are least inclined with respect to the surfaces of the guide; and
said metal layer is coated with a layer of material having a refractive index that is substantially the same as that of the body of the light guide and having one surface, which follows the saw-tooth profile of the extraction grating, and another plane surface which is substantially parallel to the outer surface of the guide in an area corresponding to which the grating is made.

4. The light guide according to claim 3, wherein the light is rotated in multiple successive reflections so as to extend the output pupil according to the component of the direction of propagation of the beams parallel to the plane faces of the body of the light guide.

5. The light guide according to claim 3, wherein the light is rotated in multiple successive reflections and extracted in multiple successive reflections so as to extend the output pupil according to the component of the direction of propagation of the beams that is parallel to the principal faces of the body of the light guide and in a direction orthogonal to said component.

6. The light guide according to claim 3, wherein the reflectance of said beam-rotation grating is constant and comprised between 0.15 and 0.25.

7. The light guide according to claim 3, wherein the reflectance of said beam-rotation grating is variable and ranges between 0.20 and 0.90.

8. The light guide according to claim 3, wherein the reflectance of said beam-rotation grating is variable and ranges between 0.30 and 0.90.

9. The light guide according to claim 3, wherein the reflectance of said beam-rotation grating is variable and ranges between 0.10 and 0.90.

10. The light guide according to claim 3, wherein the surface of said saw-tooth profiles is coated with a material chosen in the group comprising chromium and aluminum.

11. The light guide according to claim 2, wherein the body of the light guide is integrated in a lens for spectacles.

12. The light guide according to claim 2, wherein the body of the light guide is clipped on to a spectacle frame and is positioned within the field of view of the observer.

13. The light guide according to claim 2, wherein the display device has a field of view of 24°×18°.

14. The light guide according to claim 2, wherein the display device has a field of view of 16°×12°.

15. The light guide according to claim 1, wherein said coupling device has a curved input surface.

16. The light guide according to claim 1, wherein said coupling device has an input surface consisting of a diffractive grating.

17. The light guide according to claim 1, wherein said coupling device is a prism having an input surface parallel to a plane face of the body of the light guide, an output surface orthogonal to said plane face, and a totally or partially reflecting radiusing plane surface, which is inclined with respect to the input surface and the output surface.

18. The light guide according to claim 1, wherein said coupling device is a prism having an input surface inclined with respect to a plane face of the body of the light guide, an output surface orthogonal to said plane face, and an opaque radiusing surface.

19. The light guide according to claim 1, wherein the body of the light guide has at least one of its principal faces which is not plane.

20. The light guide according to claim 1, wherein the body of the light guide is integrated in a lens for spectacles.

21. The light guide according to claim 1, wherein the body of the light guide is clipped on to a spectacle frame and is positioned within the field of view of the observer.

22. The light guide according to claim 1, wherein the display device has a field of view of 24°×18°.

23. The light guide according to claim 1, wherein the display device has a field of view of 16°×12°.

24. A method for making a light guide according to claim 1, comprising the following steps:
a) moulding of the guide with the saw-tooth gratings made on the surface, using one of the methods belonging to the group: injection moulding, hot embossing, casting;
b) masking of the surfaces of the guide, except for the saw-tooth grating;
c) deposition of the metal layer with variable reflectance on the saw-tooth grating;
d) removal of mask;
e) insertion of the guide into a mould for casting;
f) deposition of the resin on the surface of the grating; and
g) polymerization of the resin;
where the steps from b) to g) are repeated for each saw-tooth grating present on the guide.

25. The method according to claim 24, comprising a step of deposition of an antiscratch coating made by dipping.

26. The method according to claim 24, wherein the deposition of the metal layer in step c) is performed by CVD, PVD, or sputtering.

27. The method according to claim 24, wherein the deposition of the resin in step f) is performed by casting.

28. The method according to claim 24, wherein the polymerization of the resin in step g) is performed by thermal or UV-radiation means.

29. The method according to claim 24, wherein, prior to deposition of the metal layers, there is used a plasma treatment or chemical treatment for favouring adhesion thereof on the substrate.

30. The method according to claim 24, wherein the variable reflectance of the coating is obtained with a relative movement of the guide with respect to a perforated mask set between the guide and the crucible containing the metal to be evaporated.

31. The method according to claim 30, wherein the shape of the mask is determined by the profile of reflectance that it is intended to obtain.

32. The method according to claim 24, wherein, after step f) and prior to step g), there is deposited on the resin a thin glass for guaranteeing planarity of the top surface of the coating.

33. The light guide according to claim 1, wherein said extraction grating is made so as to extract the light in multiple successive reflections, so as to extend the output pupil along the component of the direction of propagation of the beams that is parallel to the principal faces of the body of the light guide.

34. The light guide according to claim 1, wherein the coupling device is obtained in such a way that the beams propagate in the body of the light guide in such a way that any section of the surface of the guide in the direction of propagation is touched by the beams.

35. The light guide according to claim 1, wherein the reflectance of said grating is constant and comprised between 0.15 and 0.25.

36. The light guide according to claim 1, wherein the reflectance of said grating is variable and ranges between 0.15 and 0.2.

37. The light guide according to claim 1, wherein the reflectance of said grating is variable and ranges between 0.20 and 0.26.

38. The light guide according to claim 1, wherein the image-extraction grating lies in a plane parallel to the principal faces of the body of the light guide having the greatest distance from the observer.

39. The light guide according to claim 1, wherein the image-extraction grating lies in a plane inclined with respect to the principal faces of the body of the light guide and which radiuses two parallel plane faces of the body of the light guide.

40. The light guide according to claim 1, wherein the body of the light guide is made of a material chosen in the group comprising glass, polycarbonate, and polymethylmethacrylate.

41. The light guide according to claim 1, wherein the light propagates in the body of the light guide with a minimum angle of incidence of between 39° and 45° and a maximum angle of incidence of between 55° and 65°.

42. The light guide according to claim 1, wherein the body of the light guide has a thickness of between 2 mm and 5 mm.

43. The light guide according to claim 1, wherein said coupling device has a plane input surface.

* * * * *